Dec. 11, 1923.
S. UYAMA
1,476,740
PROCESS OF MANUFACTURING CATGUTS
Filed Dec. 8, 1920
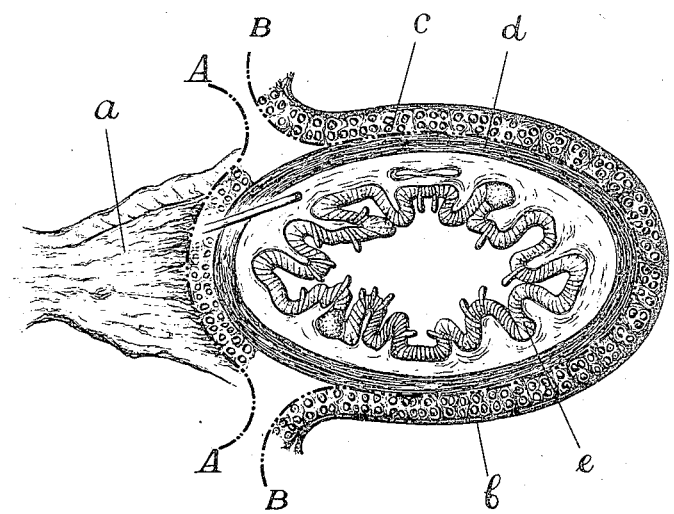
Inventor
Shunzo Uyama
By Wm Wallace White
his Attorney Patented Dec. 11, 1923.

1,476,740

UNITED STATES PATENT OFFICE.

SHUNZO UYAMA, OF TONODAN, KYOTO, JAPAN.

PROCESS OF MANUFACTURING CATGUTS.

Application filed December 8, 1920. Serial No. 429,257.

*To all whom it may concern:*

Be it known that I, SHUNZO UYAMA, a subject of the Emperor of Japan, residing at No. 421 Yabunoshita-cho, Tonodan, Kyoto, Japan, have invented new and useful Improvements in a Process of Manufacturing Catguts, of which the following is a specification.

This invention relates to a process of manufacturing catguts. Catguts are generally made from sheep's intestines, which are incised open longitudinally, and the inner part, that is to say, the mucous membrane and inner circular muscle layer scraped off by means of a comb, the outer part being kept for further treatment. According to a well known method sheep's intestines are rubbed with a stick on their outer surfaces in such a manner that the mucous membrane as well as the inner circular muscle layer are destroyed and loosened from the outer part, which is kept for further treatment.

In these known methods, any bacteria and their toxin that may dwell in the intestinal contents are apt to pass over to the outer muscle layer in course of practice, since the contents of the intestinal canal are in constant contact with the outer muscle layer, from which the catguts are produced. A catgut thus obtained, therefore, is likely to impede the cure of disease when used for therapeutical purposes. Moreover, under such methods the intestines of larger animals, as cows or horses, can not be used, for economical reasons, because the scraping off of the useless muscle layers of the thick intestines of such big animals is a very laborious operation. In the method of the present invention, however, the contents of the intestinal canal are maintained at all times separated from the outer muscle layer, so that this method is well-adapted for the treatment of the intestines of large animals such as cows, horses, donkeys, mules or the like, which intestines can be obtained more cheaply and easily than those of sheep.

To produce catguts of the best quality, only the best and fresh materials must be used. Every portion of the small intestines may be used for the purpose, but the jejunums of healthy animals, in which jejunums the requisite muscle layer grows best, are the most suitable as well as economical.

Primarily, the intestinal tube of a slaughtered animal is pressed at one end in order to remove the contents thereof. Then the part is doubly ligatured. The tube is cut at a point between the double ligatures, and the mesentery is cut off along the whole length of the tube. Next, the tube is pressed at another end and is doubly ligatured, then, it is cut off as before. Thus the required portion of the intestinal tube may be cut off with a ligature at either end, thereby preventing the contents of the tube from escaping.

The tube is then fixed at an end and is incised circumferentially, (excepting the part from which the mesentery extends) at a point near the ligature of the fixed end, so as to cut open only its external layer, that is the serous membrane and outer longitudinal muscle layer, but leaving the inner muscle layer and mucous membrane intact.

The accompanying drawing illustrates a transverse section of an intestine. In this drawing, *a* designates the mesentery or lamina mesenterii propria, *b* the serous membrane or tunica serosa intestini, *c* the outer longitiudinal muscle layer or stratum longitudinale, *d* the inner circular muscle layer or stratum circulare, and *e* the mucous membrane or tunica mucosa. The curved line A—A designates where the intestine is to be cut off from the mesentery, and B—B designates the line along which the external layer is to be stripped off.

Next, the serous membrane and outer longitudinal muscle layer are stripped off lengthwise, altogether in one film along the entire length of the tube.

This stripped film is treated with a solution of alkali, such as caustic soda or potash, until the film expands itself and becomes translucent. Then the film is taken out of the solution, and foreign materials such as small pieces of inner muscle layer, which may remain on the film, are shaved off. The film is then washed repeatedly with cold water till no trace of alkali remains in the washing water.

The washed film is cut into the required width and length, and one or more strips of the film, as the case may be, are twisted and rolled into yarn. Thus catguts of required sizes of equal diameter throughout their length are obtained. Then the yarn is dried while stretched out. The intensity of the stretch should be gradually increased as far as is compatible with the maximum tensile strength of the yarn, the said maximum tensile strength being gradually increased in course of drying. The gradual increase in the intensity of the stretch may be accomplished in many different ways. As an example, the catgut to be treated may be secured by one of its ends to a fixed point, and its opposite end secured to a string or cord which may pass over a pulley and have secured to its free end a hollow vessel or tank. The catgut is thus stretched at first by the weight of the tank. Suitable apparatus may be located so as to deliver water or mercury into said tank, a drop at a time, which dropping is continued until the catgut is completely dried. The weight of the tank will thus be gradually increased, so that the tension of the catgut will be increased. If the dropping of the liquid is properly regulated, the weight of the tank will be in proportion to the maximum tensile strength of the catgut under treatment. By this special method of drying, the strength of the yarn or catgut is increased as high as over 40 kilograms per square m. m. of the cross sectional area.

After it is perfectly dried, an undisinfected catgut is obtained. This can be used for musical instruments without any further treatment. But for catguts for therapy purposes, the yarn must be disinfected. For disinfection, the yarn should be kept in a temperature of about 160° C. for an hour, without using any disinfectant. This is one of the characteristics of the catguts thus manufactured. When a catgut made by a known method is sterilized with dry-heat, it will lose its tensile strength and become useless. That is, because a catgut produced in the ordinary method contains some foreign matters which cannot be excluded while manufacturing.

If the strips of film are treated in a disinfectant, which may be easily cleared by a further treatment, such as iodine-solution of potassium iodide, followed by another treatment of sodium hyposulphite, before they are twisted and rolled up dry-heat sterilization for a short time will be sufficient.

The drying and disinfecting methods above mentioned are typical instances adopted in my invention but ordinary drying method, that is, drying by intense stretching and sterilization with a disinfectant may be alternatively used. Fixation, construction and bleaching of catguts, which treatments are practiced in hitherto known methods, may of course be practiced in connection with the process herein described.

What I claim is:—

1. In the manufacture of catgut, the process of preparing an intestinal tube, which consists in circumferentially incising said tube so as to cut only its serous membrane and outer longitudinal muscle layer, leaving the inner muscle layer and mucous membrane intact, and stripping off the serous membrane and outer longitudinal muscle layer altogether in one film.

2. The process of manufacturing catgut from an intestinal tube, which consists in stripping from said tube a single film consisting of the serous membrane and outer muscle layer, twisting said film and stretching said film with gradually increasing intensity until dry.

3. The process of manufacturing catgut, which consists in stripping from an intestinal tube a single film consisting of the serous membrane and outer muscle layer, twisting said film, subjecting said film to the action of dry heat, and stretching the film with gradually increasing intensity until dry.

4. The process of manufacturing catgut from an intestinal tube, which consists in stripping from said tube a single film consisting of the serous membrane and outer muscle layer, treating said film with an alkali solution, twisting said film, subjecting the film to the action of dry heat, and stretching said film with gradually increasing intensity until dry.

In testimony whereof I have signed my name to this specification.

SHUNZO UYAMA.